United States Patent Office 3,464,764
Patented Sept. 2, 1969

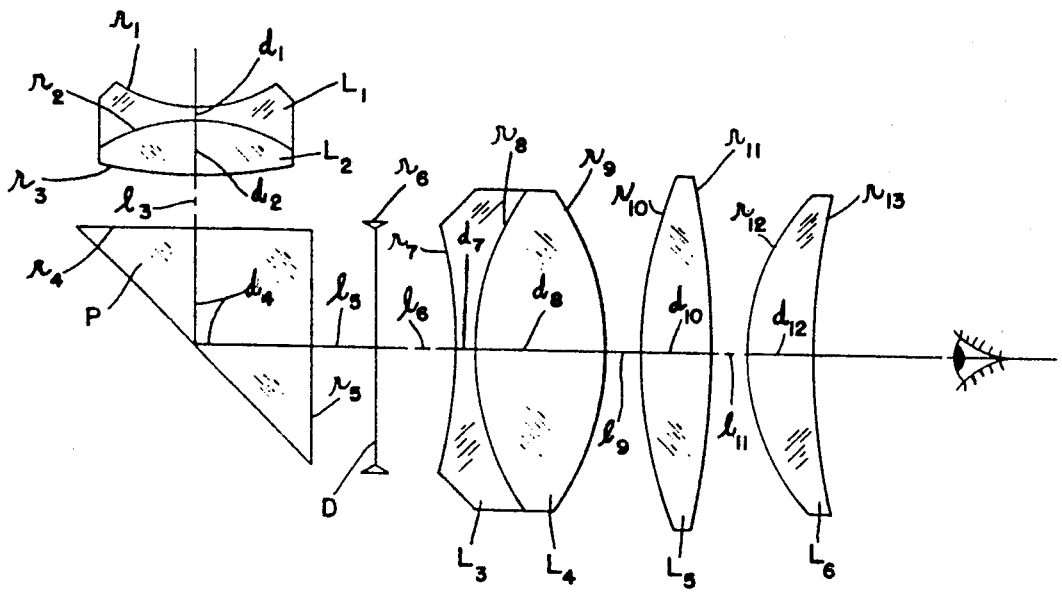

3,464,764
WIDE ANGLE EYEPIECE WITH LARGE EYE RELIEF
Wright H. Scidmore, Langhorne, and Robert J. Wolfe, Philadelphia, Pa., assignors to the United States of America as represented by the Secretary of the Army
Filed Apr. 22, 1968, Ser. No. 722,924
Int. Cl. G02b 17/00
U.S. Cl. 350—202                                  1 Claim

ABSTRACT OF THE DISCLOSURE

A compact wide angle eyepiece having large relief is provided. The eyepiece includes, proceeding towards the observer's eye, a cemented doublet negative field lens, a 90° prism, a diaphragm followed by another cemented doublet field lens, a center lens and an eyelens.

---

The invention described herein may be manufactured, used and licensed by or for the Government for governmental purposes without the payment to us of any royalty thereon.

This invention relates to eyepieces and more particularly concerns an optical device providing a large apparent field of view and extremely large eye relief.

The use of wide angle eyepieces with large eye relief is desirable in various military vehicles, such as tanks, for example, wherein, for purposes of safety of the observer therein, gun recoil or the like may endanger the eyes or body of the observer due to inadequate clearance between the observer and the optical apparatus. It may also be necessary that the observer employ cumbersome devices such as gas masks and hence, sighting efficiency will greatly be improved by the use of our device.

It is therefore a principal object of this invention to provide an eyepiece substantially possessing the aforementioned advantages.

Other objects and advantages will become apparent from a consideration of the following specification and claims and the single figure of the drawing which illustrates a diagrammatic embodiment of our inventive device, in axial section.

Briefly, the present invention is based on the discovery that by judiciously disposing a cemented doublet negative field lens, a 90° prism, a field stop or diaphragm, another type cemented doublet field lens, a singlet center lens and a singlet eyelens, an efficient and compact wide angle eyepiece having extremely large eye relief will be provided having especial value in military vehicles and the like.

In a copending patent application of Wright H. Scidmore and Mary D. Flanagan, Ser. No. 445,287, filed Apr. 2, 1965, for "Wide Angle Eyepiece With Large Eye Relief" now Patent No. 3,384,434, an eye relief of about ⅔ that of the instant invention was provided. Similarly, the Petzval radius of the eyepiece of Scidmore-Flanagan was 2.244f whereas the instant eyepiece provides a Petzval radius equal to 6.067f, resulting in excellent image quality over the entire field of view.

More specifically and referring to the drawing, in considering our device from the direction from front to rear, or towards the direction of eye E, we have provided a cemented doublet field lens of negative power, $L_1$ and $L_2$, a 90° prism P, a field stop or diaphragm D, a cemented doublet field lens, $L_3$ and $L_4$, a singlet center lens $L_5$, and a singlet eye lens, $L_6$.

The data for the aforementioned elements or components are based on a focal length, F, of our eyepiece to be 1.000 inch. This eyepiece provides an apparent field of view of 64° and a paraxial eye relief equal to 1.786F when used in an 8× telescope with the entrance pupil located at the objective. The actual eye relief is reduced to approximately 1.64F to obtain a suitable compromise for aberration of the pupil. Since our eyepiece is normally used in a telescope having another real focal plane, stop or diaphragm D, may be made somewhat larger to cover the full field of view desired so as to eliminate transverse chromatic aberration at the edges of the stop or diaphragm.

The symbols in the table infra denote the following:

TABLE I.—OPTICAL LEGEND

L—the individual lens
r—the radius of curvature
d—axial thickness of lens
l—air space
n—refractive index for "D" light
v—Abbe's number of the glass
F—focal length of eyepiece
$f_{1,2}$—focal length of cemented doublet, $L_1$-$L_2$
$f_{3,4}$—focal length of cemented doublet, $L_3$-$L_4$
$f_5$—focal length of singlet $L_5$
$f_6$—focal length of singlet $L_6$
C.A.—clear aperture

TABLE II.—LENS TABLE DATA

| Element | Radii | Thicknesses | $n_i$ | $v$ | C.A. |
|---|---|---|---|---|---|
| $L_{1,2}$ | $r_1=-1.146$ | $d_1=.097$ | $n_1=1.620$ | $v_1=60.3$ | C.A.$_1=1.160$ |
|  | $r_2=+1.245$ | $d_2=.412$ | $n_2=1.751$ | $v_2=27.8$ | C.A.$_2=1.326$ |
|  | $r_3=-5.634$ | $l_3=.048$ |  |  | C.A.$_3=1.368$ |
| P | $r_4=\pm\infty$ | $d_4=1.744$ | $n_4=1.649$ | $v_4=33.8$ | C.A.$_4=1.389$ |
|  | $r_5=\pm\infty$ | $l_5=.090$ |  |  | C.A.$_5=1.650$ |
| D | $r_6=\pm\infty$ | $l_6=.465$ |  |  | C.A.$_D=1.660$ |
| $L_{3,4}$ | $r_7=-3.881$ | $d_7=.107$ | $n_7=1.751$ | $v_7=27.8$ | C.A.$_7=1.815$ |
|  | $r_8=+2.110$ | $d_8=.945$ | $n_8=1.620$ | $v_8=60.3$ | C.A.$_8=2.067$ |
|  | $r_9=-2.110$ | $l_9=.011$ |  |  | C.A.$_9=2.299$ |
| $L_5$ | $r_{10}=+3.317$ | $d_{10}=.486$ | $n_{10}=1.620$ | $v_{10}=60.3$ | C.A.$_{10}=2.516$ |
|  | $r_{11}=-7.859$ | $l_{11}=.011$ |  |  | C.A.$_{11}=2.502$ |
| $L_6$ | $r_{12}=+1.969$ | $d_{12}=.470$ | $n_{12}=1.620$ | $v_{12}=60.3$ | C.A.$_{12}=2.319$ |
|  | $r_{13}=+17.580$ |  |  |  | C.A.$_{13}=2.222$ |

Equivalent focal length, F=1.000″.
$f_{1,2}=-3.550″$.
$f_{3,4}=11.742″$.
$f_5=3.826″$.
$f_6=3.536″$.

Lens $L_1$ is of the bi-concave singlet type and is cemented to a bi-convex singlet lens $L_2$, the resultant negative doublet having a focal length of about −3.550″ which is mainly responsible for producing the long eye relief.

After negative doublet $L_1$-$L_2$ is a 90° prism P having a face width of 1.744 inches. Next is the diaphragm D which serves as a field stop and eliminates undesirable stray light as is well known in the art. The field lens elements $L_3$ and $L_4$ are a cemented doublet comprising a bi-concave singlet lens $L_3$ cemented to an equi-convex singlet lens $L_4$. Center lens $L_5$ is a bi-convex singlet whereas eye lens $L_6$ is a convex-concave singlet lens.

The latter three components, i.e., cemented doublet lens $L_3$ and $L_4$, and singlets $L_5$ and $L_6$, all impart a converging effect on incident light. The effect of this design is to place the lenses of positive refractive power close to the eye and the lenses of negative refracting powers are placed further from the eye. This arrangement positions the principal plane outside the eyepiece towards the eye and is largely responsible for our inventive large ratio of eye relief or distance to focal length.

Lenses $L_1$, $L_4$, $L_5$ and $L_6$ are conveniently made from 620–603 glass whereas lenses $L_2$ and $L_3$ are preferably of 751–278 glass.

Our device has a Petzval curvature of 0.165F, the Petzval radius being 6.067F.

We claim:

1. A wide angle eyepiece with large eye relief comprising, from front to rear,
    a cemented doublet field lens of negative power,
    a 90° prism,
    a field stop or diaphragm,
    a cemented doublet field lens,
    a singlet center lens, and
    a singlet eye lens,
    said eyepiece conforming substantially to the following table in which dimensions are in terms of inches, and proceeding from front to rear, $L_1$ to $L_6$ designate the lenses of said eyepiece, $r_1$ to $r_{13}$ designate the radii of curvature of surfaces of said respective lenses, said prism and said diaphragm; $d_1$, $d_2$, $d_4$, $d_7$, $d_8$, $d_{10}$, and $d_{12}$ designate the axial thicknesses of said lenses and said prism; $l_3$, $l_5$, $l_6$, $l_9$ and $l_{11}$ designate the axial air space thicknesses between said lenses, prism and diaphragm; $n_1$, $n_2$, $n_4$, $n_7$, $n_8$, $n_{10}$, and $n_{12}$ designate the indices of refraction of said lenses and said prism; $v_1$, $v_2$, $v_4$, $v_7$, $v_8$, $v_{10}$ and $v_{12}$ designate the Abbe dispersion numbers of said respective lenses and said prism; and C.A.$_1$ to C.A.$_5$ designates the clear apertures of said respective lenses corresponding to $r_1$ to $r_5$ respectively, and C.A.$_7$ to C.A.$_{13}$ designates the clear apertures of said respective lenses corresponding to $r_7$ to $r_{13}$ respectively, and C.A.$_D$ designates the clear aperture of said diaphragm:

| Element | Radii | Thicknesses | $n_d$ | $v$ | C.A. |
|---|---|---|---|---|---|
| $L_{1,2}$ | $r_1 = -1.146$ | $d_1 = .097$ | $n_1 = 1.620$ | $v_1 = 60.3$ | C.A.$_1 = 1.160$ |
| | $r_2 = +1.245$ | $d_2 = .412$ | $n_2 = 1.751$ | $v_2 = 27.8$ | C.A.$_2 = 1.326$ |
| | $r_3 = -5.634$ | $l_3 = .048$ | | | C.A.$_3 = 1.368$ |
| P | $r_4 = \pm\infty$ | $d_4 = 1.744$ | $n_4 = 1.649$ | $v_4 = 33.8$ | C.A.$_4 = 1.389$ |
| | $r_5 = \pm\infty$ | $l_5 = .090$ | | | C.A.$_5 = 1.650$ |
| D | $r_6 = \pm\infty$ | $l_6 = .465$ | | | C.A.$_D = 1.660$ |
| | $r_7 = -3.881$ | $d_7 = .107$ | $n_7 = 1.751$ | $v_7 = 27.8$ | C.A.$_7 = 1.815$ |
| $L_{3,4}$ | $r_8 = +2.110$ | $d_8 = .945$ | $n_8 = 1.620$ | $v_8 = 60.3$ | C.A.$_8 = 2.067$ |
| | $r_9 = -2.110$ | $l_9 = .011$ | | | C.A.$_9 = 2.299$ |
| | $r_{10} = +3.317$ | $d_{10} = .486$ | $n_{10} = 1.620$ | $v_{10} = 60.3$ | C.A.$_{10} = 2.516$ |
| $L_5$ | $r_{11} = -7.859$ | $l_{11} = .011$ | | | C.A.$_{11} = 2.502$ |
| | $r_{12} = +1.969$ | $d_{12} = .470$ | $n_{12} = 1.620$ | $v_{12} = 60.3$ | C.A.$_{12} = 2.319$ |
| $L_6$ | $r_{13} = +17.580$ | | | | C.A.$_{13} = 2.222$ |

Equivalent focal length, F = 1.000".
$f_{1,2} = -3.550''$.
$f_{3,4} = 11.742''$.
$f_5 = 3.826''$.
$f_6 = 3.536''$.

References Cited

UNITED STATES PATENTS 3,384,434   5/1968   Scidmore et al.

DAVID SCHONBERG, Primary Examiner

A. OSTRAGER, Assistant Examiner

U.S. Cl. X.R.

350—216. 220